United States Patent
Shrestha et al.

(10) Patent No.: US 10,177,633 B2
(45) Date of Patent: Jan. 8, 2019

(54) MULTIPHASE FRACTIONAL SLOT CONCENTRATED WINDING MACHINE WITH END MOUNTED DETACHABLE OR INTEGRATED MULTIPHASE SERIES CONVERTER CIRCUIT

(71) Applicant: ABB Schweiz AG, Baden (CH)

(72) Inventors: Ghanshyam Shrestha, Apex, NC (US); Zhiguo Pan, Cary, NC (US); Mario Schweizer, Zurich (CH); Darren Dale Tremelling, Apex, NC (US); Waqas Mahmood Arshad, Raleigh, NC (US)

(73) Assignee: ABB Schweiz AG, Baden (CH)

( * ) Notice: Subject to any disclaimer, the term of this patent is extended or adjusted under 35 U.S.C. 154(b) by 833 days.

(21) Appl. No.: 14/581,927

(22) Filed: Dec. 23, 2014

(65) Prior Publication Data

US 2016/0181893 A1    Jun. 23, 2016

(51) Int. Cl.
*H02K 11/00* (2016.01)
*H02K 21/14* (2006.01)
*H02K 17/16* (2006.01)
*H02K 3/12* (2006.01)
*H02K 3/28* (2006.01)
(Continued)

(52) U.S. Cl.
CPC ........... *H02K 11/0073* (2013.01); *H02K 3/12* (2013.01); *H02K 3/28* (2013.01); *H02K 3/522* (2013.01); *H02K 9/06* (2013.01); *H02K 11/0094* (2013.01); *H02K 11/044* (2013.01); *H02K 11/33* (2016.01); *H02K 17/16* (2013.01); *H02K 21/14* (2013.01);
(Continued)

(58) Field of Classification Search
CPC .... H02K 11/0073; H02K 21/14; H02K 17/16; H02K 3/12; H02K 3/28; H02K 9/06; H02K 11/33; H02K 3/522; H02K 11/0094; H02K 11/044; H02K 11/00; H02K 1/148; H02K 5/225; H02K 2203/03
USPC .................................................. 310/179–210
See application file for complete search history.

(56) References Cited

U.S. PATENT DOCUMENTS 5,006,744 A    4/1991  Archer et al.
5,491,370 A    2/1996  Schneider et al.
(Continued)

FOREIGN PATENT DOCUMENTS

CN    202 759 344 U    2/2013
DE    297 00 643 U1    3/1997
(Continued)

OTHER PUBLICATIONS

Notification of Transmittal of the International Search Report and the Written Opinion of the International Searching Authority, or the Declaration for International Application No. PCT/US2015/058274 (dated Feb. 19, 2016).

(Continued)

*Primary Examiner* — Naishadh Desai
(74) *Attorney, Agent, or Firm* — J. Bruce Schelkopf; Taft Stettinius & Hollister LLP (57) ABSTRACT

The subject matter described herein includes a multiphase fractional slot concentrated winding machine. One such machine includes a machine module including a rotor and a stator. The stator includes a plurality of radially extending teeth. Each tooth is individually wound with a coil. The machine further includes a multiphase series converter circuit physically connected to an end of the machine module to energize the coils for multiphase operation.

25 Claims, 8 Drawing Sheets

(51) Int. Cl.
*H02K 9/06* (2006.01)
*H02K 11/04* (2016.01)
*H02K 3/52* (2006.01)
*H02K 11/33* (2016.01)
*H02K 1/14* (2006.01)
*H02K 5/22* (2006.01)

(52) U.S. Cl.
CPC .............. *H02K 1/148* (2013.01); *H02K 5/225* (2013.01); *H02K 2203/03* (2013.01)

(56) References Cited

U.S. PATENT DOCUMENTS

| | | | |
|---|---|---|---|
| 5,583,387 A | 12/1996 | Takeuchi et al. | |
| 5,698,923 A | 12/1997 | Scherzinger et al. | |
| 5,729,072 A | 3/1998 | Hirano et al. | |
| 5,786,651 A | 7/1998 | Suzuki | |
| 6,127,753 A | 10/2000 | Yamazaki et al. | |
| D445,762 S | 7/2001 | Shida et al. | |
| 6,356,005 B1 * | 3/2002 | Hsu | H02K 1/146 310/254.1 |
| 6,856,064 B2 | 2/2005 | Masumoto et al. | |
| 6,924,570 B2 | 8/2005 | De Filippis et al. | |
| 6,946,769 B2 | 9/2005 | Yamamura et al. | |
| 6,984,913 B2 | 1/2006 | Neuenschwander | |
| 7,479,725 B2 | 1/2009 | Welke et al. | |
| 7,514,828 B2 | 4/2009 | Vollmuth et al. | |
| 7,598,637 B2 | 10/2009 | Niehaus et al. | |
| 7,626,304 B2 | 12/2009 | Morioka et al. | |
| 7,701,154 B2 | 4/2010 | Oesterreicher et al. | |
| 7,960,889 B2 | 6/2011 | Yamamoto | |
| 8,008,832 B2 | 8/2011 | Rhode | |
| 8,093,779 B2 | 1/2012 | Hiramatsu et al. | |
| 8,310,115 B2 * | 11/2012 | Elantably | H02K 19/103 310/179 |
| 8,360,735 B2 * | 1/2013 | Hanaoka | F04D 19/007 310/112 |
| 2004/0051417 A1 | 3/2004 | Yamazaki et al. | |
| 2006/0070229 A1 | 4/2006 | Stewart et al. | |
| 2006/0071569 A1 | 4/2006 | Stewart et al. | |
| 2006/0267431 A1 | 11/2006 | Johnson et al. | |
| 2007/0103008 A1 * | 5/2007 | Miyamoto | H02P 25/06 310/12.19 |
| 2008/0073986 A1 * | 3/2008 | Lee | H02K 5/18 310/71 |
| 2010/0213788 A1 | 8/2010 | Guttenberger et al. | |
| 2010/0327680 A1 | 12/2010 | Miyachi et al. | |
| 2011/0026227 A1 * | 2/2011 | Monster | H02K 11/022 361/710 |
| 2011/0068661 A1 * | 3/2011 | Clendenen | H02K 11/33 310/68 D |
| 2011/0169352 A1 | 7/2011 | Nagao et al. | |
| 2011/0298321 A1 | 12/2011 | Tang et al. | |
| 2013/0106255 A1 | 5/2013 | Tamura et al. | |
| 2013/0127391 A1 * | 5/2013 | Lewis | H02P 25/18 318/498 |
| 2015/0012163 A1 * | 1/2015 | Crawley | B25J 11/008 701/23 |

FOREIGN PATENT DOCUMENTS

| | | |
|---|---|---|
| DE | 10 2012 110635 A1 | 6/2014 |
| EP | 1 418 660 B1 | 5/2007 |
| JP | 2005039932 A | 2/2005 |
| WO | WO 2014/125412 A1 | 8/2014 |

OTHER PUBLICATIONS

Magnussen et al., "Winding Factors and Joule Losses of Permanent Magnet Machines with Concentrated Windings," Royal Institute of Technology, IEEE Electric Machines and Drives Conference (2003).

Allied Motion Technology Overview, "Outer Rotor Brushless DC Motors," Allied Motion Technologies, Inc., http://www.alliedmotion.com/Data/Documents/KinetiMax_TechnologyOvr_R3(scrn).pdf, pp. 1-2 (Publication Dated Unknown).

Barcaro et al., "Analysis and Tests of a Dual Three-Phase 12-slot 10-pole Permanent Magnet Motor," IEEE, pp. 3587-3594 (Nov. 2010).

El-Refaie et al., "Fractional-Slot Concentrated-Windings Synchronous Permanent Magnet Machines: Opportunities and Challenges," IEEE Transactions on Industrial Electronics, vol. 57, No. 1, pp. 107-121 (Jan. 2010).

Jung et. al, "Nine-phase Permanent Magnet Motor Drive System for an Ultra-High speed Elevator," IEEE, pp. 1841-1846 (Copyright 2009).

Brown et al., "Power Converter Design for an Integrated Modular Motor Drive," Industry Applications Conference, 42nd IAS Annual Meeting. Conference Record of the 2007 IEEE, pp. 1322-1328 (2007).

* cited by examiner

MULTIPHASE FRACTIONAL SLOT CONCENTRATED WINDING MACHINE WITH END MOUNTED DETACHABLE OR INTEGRATED MULTIPHASE SERIES CONVERTER CIRCUIT

TECHNICAL FIELD

The subject matter described herein relates to multiphase fractional slot concentrated winding electric machines. More particularly, the subject matter described herein relates to a multiphase fractional slot concentrated winding machine with an end mounted detachable or integrated multiphase series converter circuit.

BACKGROUND

A multiphase machine, such as a multiphase electric machine, includes windings with currents that are operated out of phase with each other. For example, a three-phase electric motor may include windings or winding groups that are operated with currents that are 120° out of phase with each other. Multiphase motors may have more than three phases where the phase difference between windings or winding groups is nominally 360°/N, where N is the number of windings or winding groups.

If the rotor in a multiphase machine includes permanent magnets, then the machine is a permanent magnet machine. If the rotor in a multiphase machine includes coils instead of permanent magnets, then the machine is an wound field synchronous machine or induction machine.

A distributed winding multiphase machine is a machine in which stator windings for a given pole or phase span multiple slots or teeth in the inner circumference of the stator. In contrast, a concentrated winding multiphase machine is a machine in which windings for a given pole or phase span only an individual tooth in the inner circumference of the stator. A fractional slot permanent magnet machine is a machine in which stator windings are non-overlapping, i.e., teeth in the inner periphery of the stator are wound such that a winding around one tooth does not extend around another tooth.

Problems with some existing induction and fractional slot permanent magnet machines include the requirement of separate dedicated cooling for the voltage drives that drive the machines. Similarly ingress protection of converters requires the converters to be installed in separate locations from the machine. In some three phase induction machines, converters are maintained in a separate room from the motors to feed three phase power to each motor. Requiring such separate converters increases the cost and complexity of the variable speed drive system as additional installation and component costs add up. Even in variable speed drive system machines with integrated converters, dedicated cooling and converter electronic components that are rated for the entire supply voltage are required. For example, the power supply voltage that is connected across the terminals of a multiphase machine can be 600 volts DC or more. Connecting such a high voltage across the terminals mean that the electronic components within the terminal must be rated for the entire supply voltage. Requiring conventional high voltage components increases the cost of the machine compared to possible alterations.

Accordingly, in light of these difficulties, there exists a need for a multiphase fractional slot concentrated winding machine with an integrated or detachable end mounted multiphase series converter circuit.

SUMMARY

The subject matter described herein includes a multiphase fractional slot concentrated winding machine. One such machine includes a machine module including a rotor and a stator. The stator includes a plurality of radially extending teeth. Each tooth is individually wound with a coil. The stator can also be one integral structure with winding around each tooth. The machine further includes a multiphase series converter circuit physically connected to an end of the machine module to energize the coils for multiphase operation.

According to another aspect, a multiphase fractional slot concentrated winding machine includes a machine module including a rotor and a stator. The stator includes a plurality of radially extending teeth. Each tooth is individually wound with a coil. The coil made especially of alumunium material can fill the available slot optimally and can be wound much more easily than a thicker conductor (such as copper). The machine further includes a converter module detachably connectable to the machine module. The converter module includes a multiphase series converter circuit to energize the coils for multiphase operation. The converter module comprises a cylindrical member connectable to a non-drive end of the machine module.

According to another aspect, a multiphase fractional slot concentrated winding machine includes a machine module including a rotor and a stator, the stator including a plurality of radially extending teeth and each tooth is individually wound with a coil. The machine further includes a converter module detachably connectable to the machine module, the converter module including a multiphase series converter circuit to energize the coils for multiphase operation, wherein the multi-phase series converter circuit includes a plurality phase group converter circuits that drive coils in a phase group with a common phase and that are connectable in series across a power supply voltage to divide the power supply voltage.

The subject matter described herein can be implemented in software in combination with hardware and/or firmware. For example, the subject matter described herein can be implemented in software executed by a processor. In one exemplary implementation, the subject matter described herein can be implemented using a non-transitory computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

Preferred embodiments of the subject matter described herein will now be explained with reference to the accompanying drawings, wherein like reference numerals represent like parts, of which.

DETAILED DESCRIPTION

Figure 1:
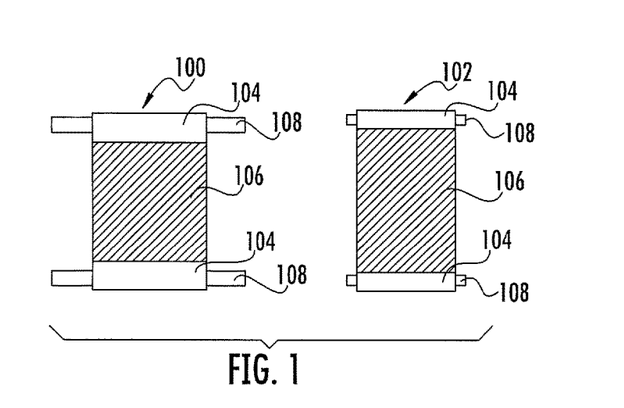
FIG. 1 is a diagram illustrating an axial comparison between an induction machine and a fractional slot concentrated winding permanent magnet machine.

Permanent magnet machines with fractional slot concentrated windings (tooth wound—FSCW) are popular because they have a very simple winding and the total volume of the machine is reduced significantly as the end windings are significantly shorter than a distributed winding machine. For example a 7-10 kW distributed winding machine has an end winding region in the range of 120-130 mm in axial length, whereas a fractional slot concentrated winding machine with multiple poles will have 30-40 mm in end winding axial length per end. A volumetric comparison of 4 pole machine with a multipole fractional slot concentrated winding machine is given in FIG. 1. More particularly, the left hand drawing in FIG. 1 is an axial view of a portion of an induction machine 100 and the right hand drawing is an axial view of a portion of a fractional slot concentrated permanent winding permanent magnet machine 102. Each machine includes a stator 104, a rotor (not shown), a bore 106 in which the rotor is inserted (if the machine is an inner rotor design) and stator end windings 108. If the machine is an outer rotor design, the rotor may surround stator 104.

It can be seen from a comparison of the left and right hand drawings that end windings 108 of induction machine 100 are greater in axial length than end windings 108 of fractional slot concentrated winding machine 102. This is because the end windings of the fractional slot concentrated winding machine only extend around individual teeth and do not extend to other teeth.

It can also be seen that FSCW machine has larger air gap diameter and stack length owing to the reduced stator yoke height of the machine for the same outer diameter of the machine. However such FSCW machine has several drawbacks such as high harmonic content resulting in higher stator, rotor back iron, and also magnet losses for machines with rare earth magnets due to circulating eddy currents in the magnets. However for ferrite magnets the magnet losses are insignificant. This is because the ferrite magnets have very high resistivity so no significant eddy currents circulate in these magnets. Such machines also have lower winding factors compared to the distributed winding machines. Practical 3 phase designs of such tooth wound machines have winding factors ranging from 0.866 to 0.94.

Figure 2A:
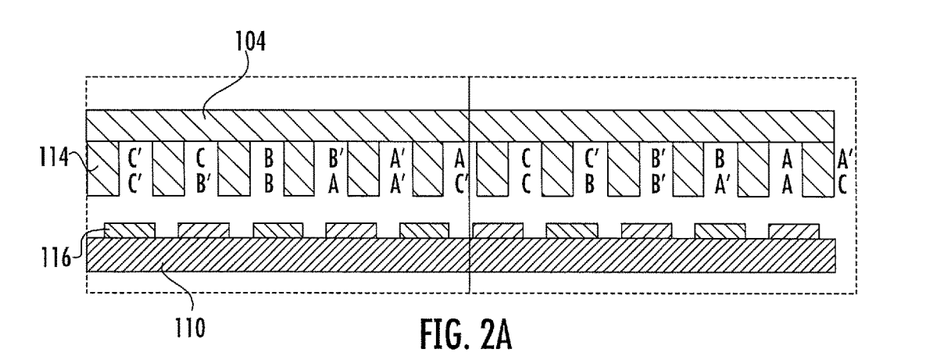
FIG. 2A is an axial view represented in a straight/linear view of a stator and a rotor of a fractional slot permanent magnet machine according to an embodiment of the subject matter described herein.

A FSCW machine with 12 stator slots and 10 rotor poles is shown in FIG. 2A with a winding configuration for 3 phase operation. More particularly, in FIG. 2A, the stator 104 and rotor 110 are rolled out in a linear configuration as they would be during manufacturing. Stator 104 includes teeth 114 around which stator coils are wound. The alphabetic characters in FIG. 2A illustrate different phases (A, B, and C phases). For example, the letters C-C' located on opposite sides of a tooth 114 indicates that a winding for the C phase C-C' goes around that tooth. It can be seen from FIG. 2A that the windings are concentrated and non-overlapping because each tooth 114 only contains windings for an individual phase and windings around each tooth do not extend to adjacent teeth. Thus, FIG. 2A provides an example of a three-phase fractional slot concentrated winding electric machine.

Figure 2B:
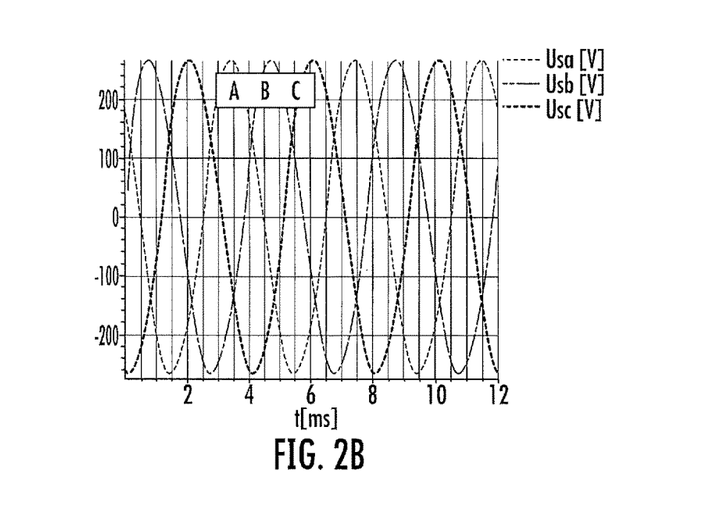
FIG. 2B is a graph illustrating an exemplary phase sequence of the fractional slot concentrated winding permanent magnet machine illustrated in FIG. 2A according to an embodiment of the subject matter described herein.

In FIG. 2A, rotor 110 includes permanent magnets 116 mounted on the outer surface of the rotor. Because rotor 110 includes permanent magnets, the machine illustrated in FIG. 2A is a permanent magnet machine. As stated above, this is a machine with a combination of 12/10 (12 slots and 10 poles), which is the lowest phase multiple with an even number of poles. The back electromotive force (emf) and the phase sequence of the machine are given in FIG. 2B. The winding factor of this machine can be calculated to be 0.933.

Figure 3A:
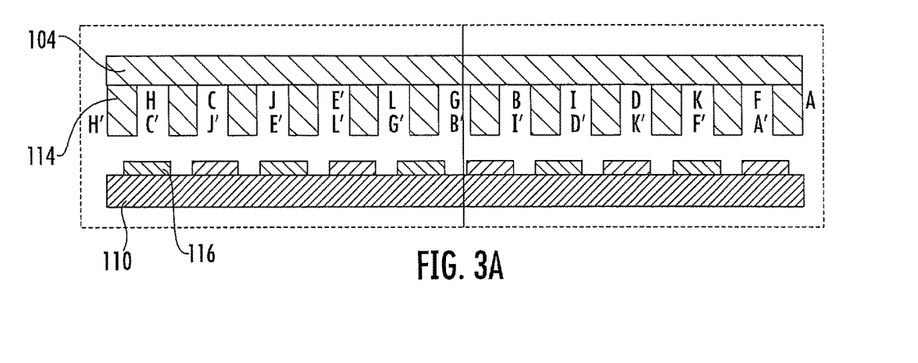
FIG. 3A is an axial view of a 12 slot, 10 pole, 12 phase machine according to an embodiment of the subject matter described herein.
Figure 3B:
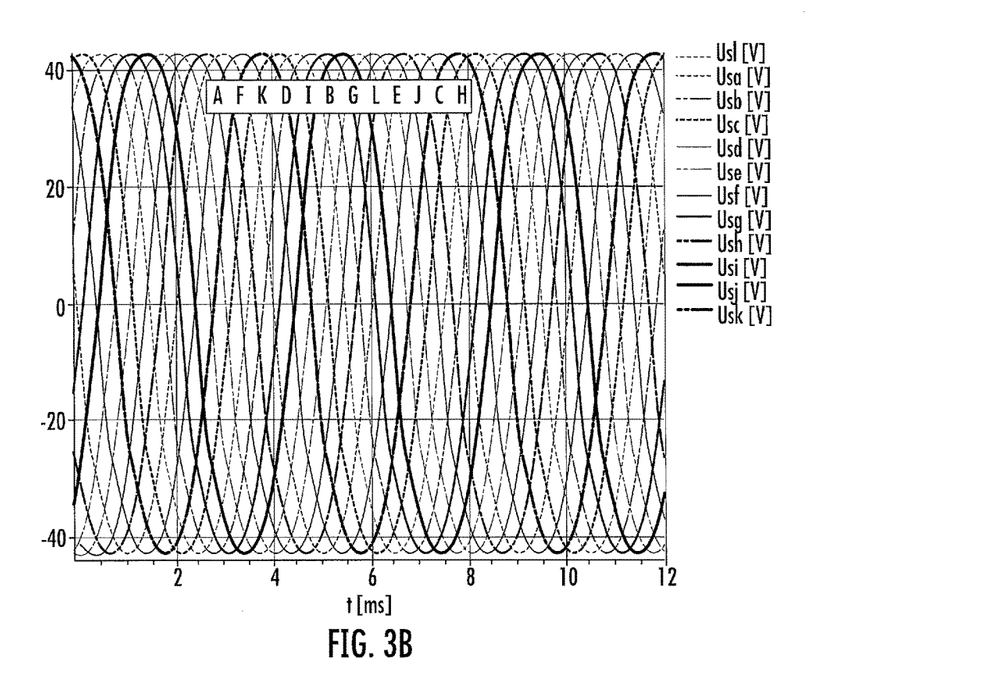
FIG. 3B is a graph illustrating a phase sequence of the 12 phase machine illustrated in FIG. 3A according to an embodiment of the subject matter described herein.

The same machine illustrated in FIG. 2A can be wound as shown in FIG. 3A and the respective back emf is shown in FIG. 3B. In FIG. 3A, the windings are configured such that the stator has twelve phases and the rotor has ten poles. The stator windings are no longer connected together into phase groups as illustrated in FIG. 2A to form a three-phase machine. The winding factor for such machine is 0.965, so that the back emf is about 3% higher for this configuration compared to the 3 phase configuration. A 24 phase machine can be formed with a 22 pole machine using the same winding configuration illustrated in FIGS. 3AB. Such a machine configuration would mean that all of the teeth of the machine are wound in the same direction therefore simplifying the winding process of the machine. The use of such a multiphase machine will increase the peak torque density of the machine by about 3-5% compared to a 3 phase fractional slot machine as the winding factor is about 3% higher, due to the elimination of the winding distribution factor penalty. Iron loss reduction in the stator (~6%) and reduction solid back iron losses (~60-70%) was observed for the same operating condition in simulations when compared to a conventional 3 phase fractional slot machine. Table 1 below shows the comparative performance of 3 and 12 phase motor with a ferrite magnet rotor. Ferrite magnets are chosen due to their cost advantage compared to rare earth magnets. However rare earth magnets could also be used for the multiphase FSCW machine and will have reduced magnet losses compared to traditional three phase FSCW machines. Here the 12 slots and 10 poles machine example is taken but this could be extended to other slot pole combination of fractional slot concentrated winding machine also.

TABLE 1

Comparison of Different Phase and
Drive Waveforms for FSCW Machines

|  | 3 phase | 12 phase | 12 phase | 12 phase |
| --- | --- | --- | --- | --- |
| Back emf | sin | sin | sin | trapezoid |
| Current wave | sin | sin | trapezoid | trapezoid |
| p.u. current | 1 | 1 | 1 | 0.93 |
| p.u. power | 1 | 1 | 1 | 1 |
| Power factor | 0.87 | 0.9 | 0.89 | 0.68 |
| Air gap flux density | 0.31 | 0.31 | 0.31 | 0.33 |
| p.u. copper loss | 1 | 1 | 1 | 0.88 |
| p.u. stator iron loss | 1 | 0.95 | 0.95 | 1.97 |
| p.u. rotor back iron | 1 | 0.22 | 0.31 | 0.43 |

Figure 4A:
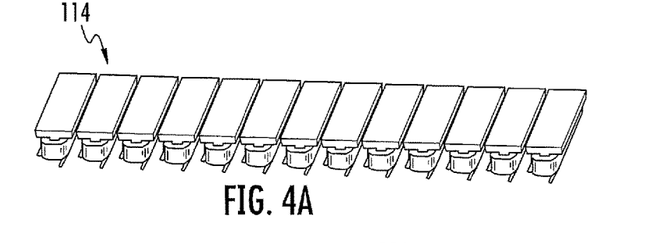
FIG. 4A is a perspective view of stator teeth for a multiphase fractional slot concentrated winding permanent magnet machine according to an embodiment of the subject matter described herein.
Figures 4B, 5A, 5B:
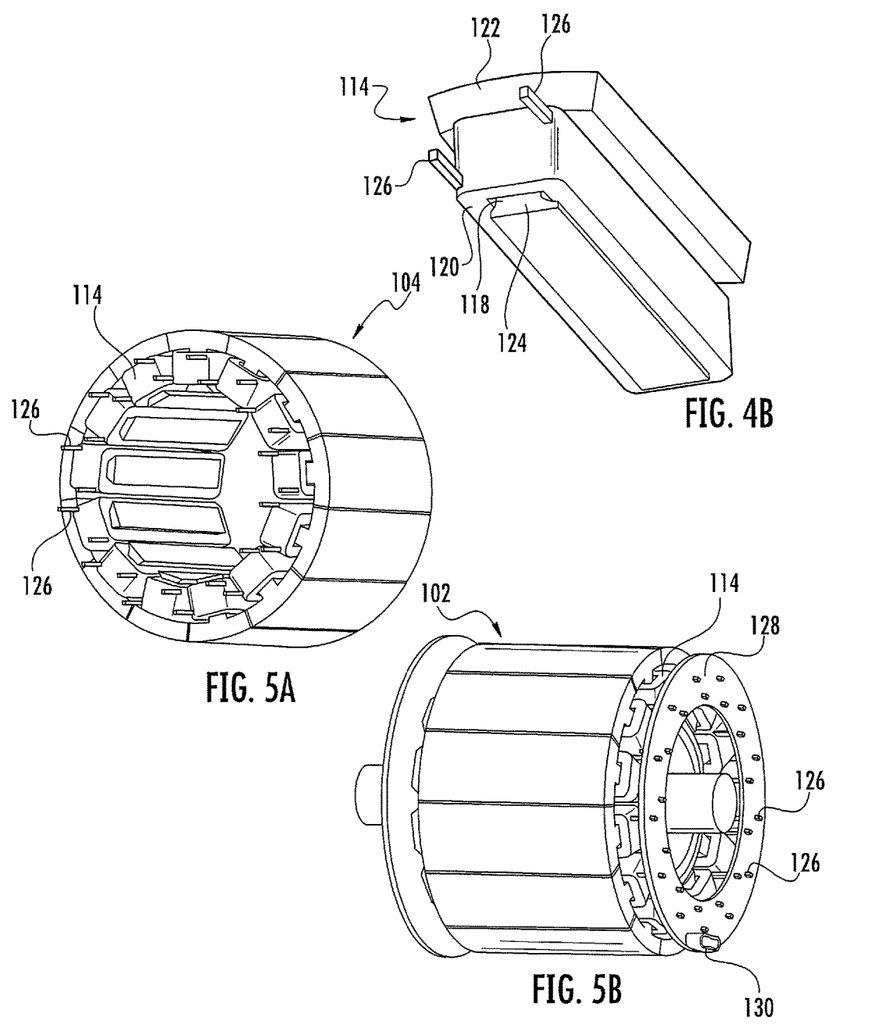
FIG. 4B is a diagram of an individual tooth of a multiphase fractional slot concentrated winding permanent magnet machine according to an embodiment of the subject matter described herein.
FIG. 5A is a perspective view of a stator for a multiphase fractional slot concentrated winding permanent magnet machine according to an embodiment of the subject matter described herein.
FIG. 5B is a perspective view of a multiphase fractional slot concentrated winding permanent magnet machine with an end mounted converter according to an embodiment of the subject matter described herein.

According to an aspect of the subject matter described herein, a multiphase fractional slot permanent magnet machine includes an end mounted converter that is either detachably connected or integrated with the end of the motor. To facilitate attachment with an end mounted converter, individual teeth may be wound in the same direction and may include connector pins that extend outward from a common end of each tooth. FIGS. 4A and 4B illustrate exemplary tooth configurations for a stator for a multiphase fractional slot concentrated winding machine according to an embodiment of the subject matter described herein. Referring to FIG. 4A, individual teeth 114 are rolled out in a flat configuration, which is how the teeth would appear during manufacturing. In FIG. 4B, an individual tooth 114 includes a core 118 which may be made of laminated steel or other magnetic material around which a coil 120 is wound. Core 118 includes an outer portion 122 that forms the outer periphery of the stator and an inner portion 124 that forms the inner diameter of the stator. Coil 120 may be wound in a clockwise or counterclockwise direction around tooth 114 and may include end connector pins 126 for connecting to the converter. As stated above, the coils may be wound around all teeth in the same direction, such that connector pins 126 appear in the same location on each tooth to facilitate connection with a converter.

FIG. 5A illustrates teeth 114 rolled together in a cylindrical configuration to form stator 104. As illustrated in FIG. 5A, connector pins 126 of teeth 114 are on the same axial side of stator 104, which facilitates connection to converter/drive circuitry during manufacturing. In FIG. 5A, each tooth 114 is individually wound with windings that do not extend to adjacent or non-adjacent teeth. Twelve teeth 114 are illustrated in the example illustrated in FIG. 5A, which indicates twelve separate phases, as the windings are not connected to each other. However, a multiphase concentrated slot permanent magnet machine according to an embodiment of the subject matter described herein may include more or fewer teeth than the machine illustrated in FIG. 5A. In addition, as will be described in detail below, stator windings may be connected together into phase groups, and the windings in each phase group may be driven by current waveforms of the same or different phases.

FIG. 5B illustrates the connection of the stator windings to an end mounted printed circuit board. In FIG. 5B, connector pins 126 of teeth 114 are connected to a common end mounted printed circuit board 128. Printed circuit board 128 comprises an annular member with a central aperture through which the shaft extends. Printed circuit board 128 includes a high voltage connector 130 for connection to a modular converter circuitry, which will now be described in more detail.

Figure 6:
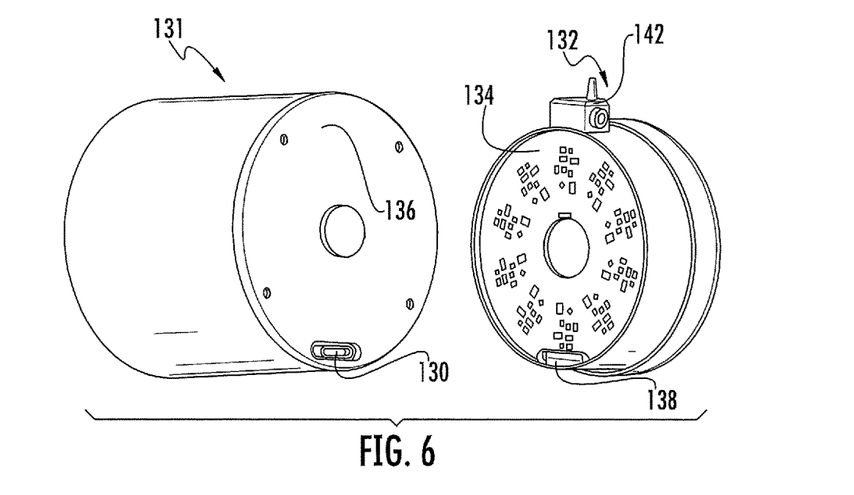
FIG. 6 is a perspective view of a machine module and a detachable converter module forming a multiphase fractional slot concentrated winding permanent magnet machine according to an embodiment of the subject matter described herein.

FIG. 6 illustrates a multiphase fractional slot concentrated winding machine module 131 with connector 130 protruding from one axial end of a machine module 131 for connecting to a detachably connectable end mounted converter module 132. Converter module 132 includes a converter circuit assembly 134 that includes the multiphase conversion and rectification circuitry, depending on whether the power supply is DC or AC. Converter circuit assembly 134 may include one or more annular members, at least one of which may include a central aperture. In the illustrated example, machine module 131 includes an end plate 136 to which converter circuit assembly 134 mounts. The end plate limits the heat from the motor side to transfer to the converter side. In one embodiment, converter circuit assembly 134 may be bolted to end plate 136. Converter circuit assembly 134 includes a connector 138 that connects to connector 130 on machine module 131. Because converter module 132 is detachably connectable to machine module 131, replacement of machine module 131 or converter module 132 can be easily replaced in the event of an operational failure. The converter module can be encapsulated in a resin for better thermal performance and also reduce the effect of vibration of the motor drive system. The machine module and the converter module can have additional fins in order to increase the heat transfer.

A terminal box 142 may be mounted on the outer surface of converter module 132 for electrical connection to an AC or DC power supply. If the power supply is an AC power supply, terminal box 142 or converter circuit assembly 134 may include rectifier circuitry. If the power supply is DC, the rectifier circuitry may be omitted.

Figure 7A:
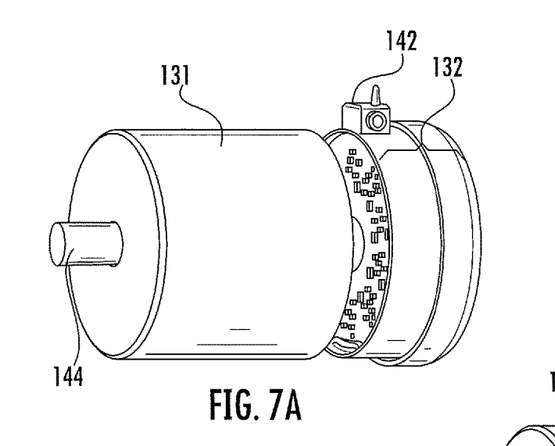
FIGS. 7A and 7B respectively illustrate the converter module in its detached and attached states according to an embodiment of the subject matter described herein.
Figure 7B:
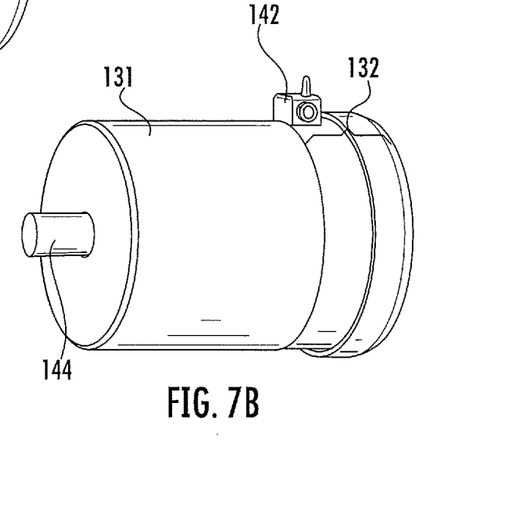

FIGS. 7A and 7B respectively illustrate converter module 132 in its detached and attached state. In FIGS. 7A and 7B, converter module 132 attaches to the non-drive end of machine module 131. A shaft 144 protrudes from the drive end of machine module 131. Shaft 144 may include a weak magnet (not shown) mounted on the circumference of shaft for sensing by a Hall Effect sensor (not shown). The Hall Effect sensor may be included in converter module 132. The purpose of the Hall Effect sensor is to determine rotor position. The Hall Effect sensor may be located on the inverter circuit in converter module 132 or on the converter circuit in converter module 132, which would allow the motor to be completely sealed on the non-drive end.

Figures 8A, 8B:
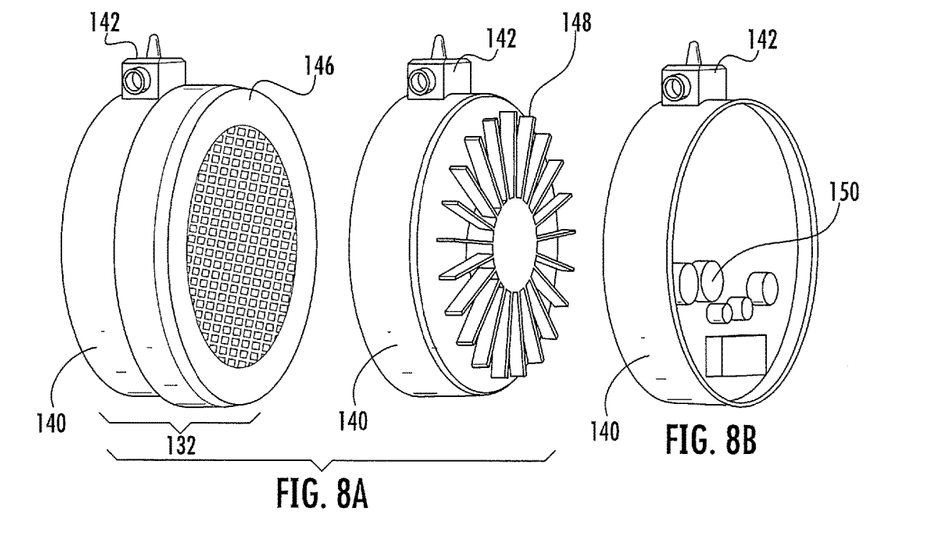
FIGS. 8A and 8B respectively illustrate a fan assembly for cooling the motor and the drive of a multiphase fractional slot concentrated winding permanent magnet machine according to an embodiment of the subject matter described herein.

FIGS. 8A and 8B respectively illustrate a fan and a rectifier that may be included in converter module 132. In FIG. 8A, converter module 132 includes converter circuit section 140 and a fan shroud 146. Converter circuit section 140 comprises a cylindrical housing that surrounds the converter circuit assembly 134. Fan shroud 146 may cover a fan 148. In the illustrated example, fan shroud 146 includes a grill 147, which allows fan 148 to draw air through the interior of machine module 131 and converter module 132, which provides cooling for both machine module 131 and converter module 132. Fan 148 may be driven with or separately from shaft 144. In the illustrated example, fan 148 is driven separately from shaft 144 using drive circuitry (not shown), which may be located in converter module 132. Because the fan is driven separately from shaft 144, the fan can be run at variable speed and can be made unidirectional with higher efficiency. Because converter module 132 is end mounted, it is not necessary to have separate cooling fans for converter module 132 and machine module 131. The cooling fan can also be other designs where it is mounted around the housing. Other kinds of cooling systems using liquid or air can also be used. As a result, the cost of the fractional slot concentrated winding machines described herein may be less than those with separate converters that require cooling separate from that of their respective motor.

As illustrated in FIG. 8B, converter module 132 may include rectifier circuitry 150 for rectifying AC power supply voltage into DC. As stated above, rectifier circuitry 150 may be omitted if a DC power supply is used.

Figure 9:
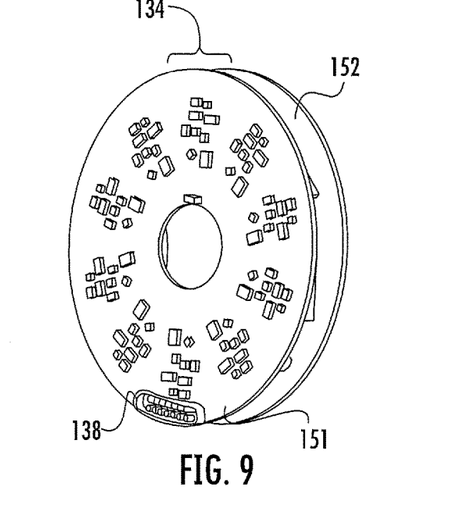
FIG. 9 is a perspective view of a drive for a multiphase fractional slot concentrated winding machine according to an embodiment of the subject matter described herein.

FIG. 9 illustrates one example of converter circuit assembly 134 in more detail. In FIG. 9, converter circuit assembly 134 includes two disk shaped printed circuit boards 151 and 152. Printed circuit board 151 may include DC to multiphase conversion circuitry. For example, the DC To multiphase converter circuitry may convert from DC to three or more phases. An example of a multiphase converter circuit will be described in more detail below. Printed circuit board 151 may include AC to DC rectification circuitry 150. In the example illustrated in FIG. 9, converter circuit assembly 134 includes separate circuit boards for the DC to multiphase converter and the rectifier are located on separate circuit boards. In an alternate embodiment, a single printed circuit board may be used such that the phase conversion and rectifier circuitry are located on the same printed circuit board.

Figure 10A:
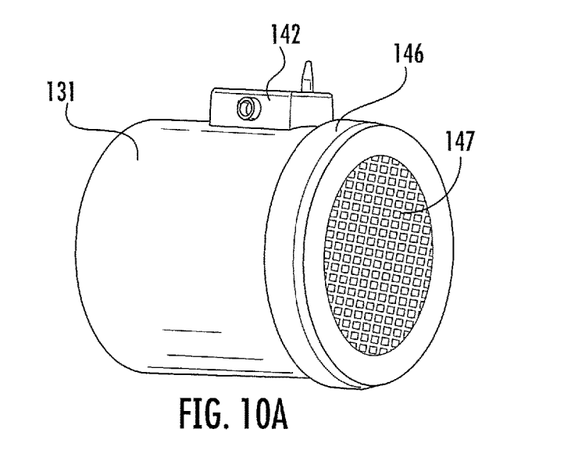
FIGS. 10A, 10B, and 10C respectively illustrate a multiphase fractional slot concentrated winding permanent magnet machine with an integrated converter circuit according to an embodiment of the subject matter described herein.
Figure 10B:
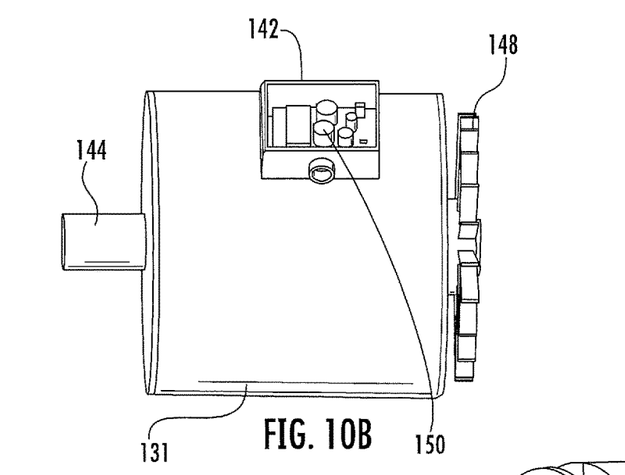
Figure 10C:
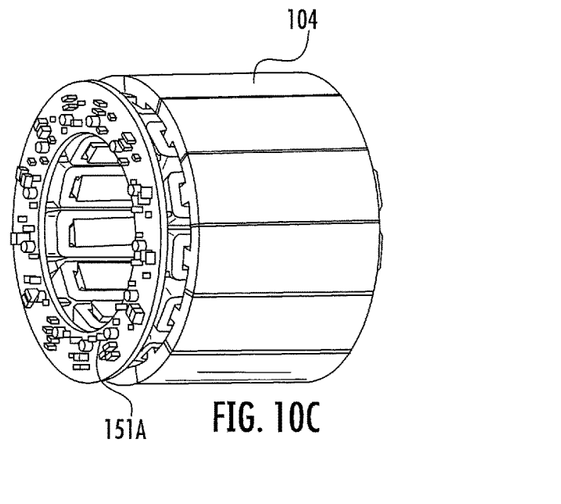

In the embodiments illustrated in FIGS. 6-9, converter module 132 is detachably connectable to machine module 131. In an alternate embodiment, the converter circuit may be integrated within machine module 131. FIGS. 10A-10C illustrate such an embodiment. In FIG. 10C, a converter printed circuit board 151A is non-detachably connected to the drive end of machine module 131. Converter printed circuit board 151A includes DC to multiphase conversion circuitry, as described above. Converter printed circuit board 151A is similar in physical structure to converter printed circuit board 151 except that the center aperture of printed circuit board 151A is larger than that of printed circuit board 151 to allow insertion of the rotor during manufacturing.

In FIG. 10B, terminal box 142 includes rectifier circuitry 150. Rectifier circuitry rectifies AC power supply voltage into DC. Fan 148 is mounted to the non-drive end of machine module 131. Fan shroud 146 covers fan 148 to protect fan 148 and reduce the likelihood of injury to operators. The use of non-shaft mounted fan can make the fan torque limited so that a shroud might not be necessary.

Figure 11:
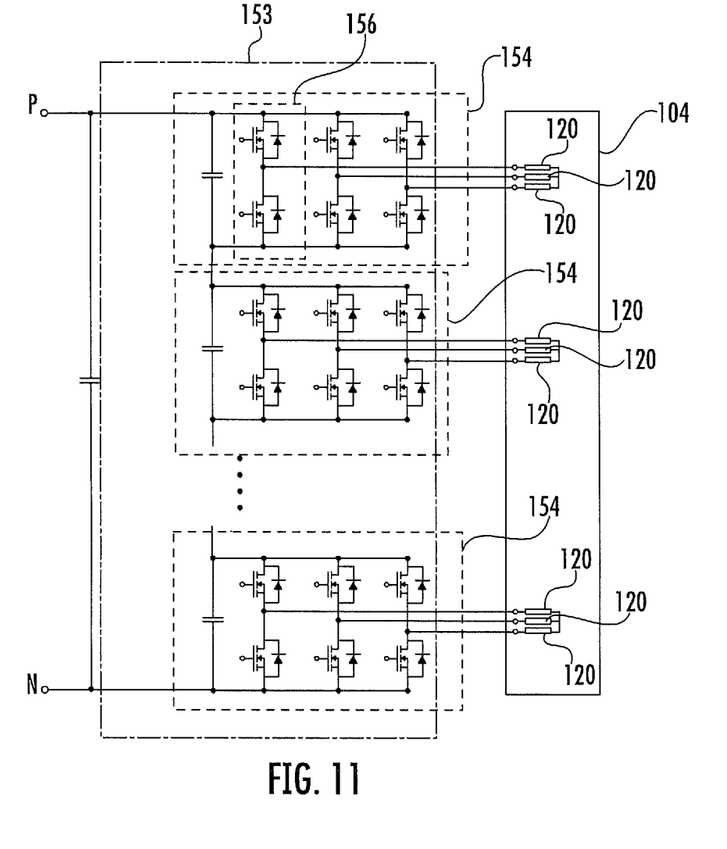
FIG. 11 is a circuit diagram illustrating a multiphase series converter circuit for use in an end mounted drive in a multiphase fractional slot concentrated winding permanent magnet machine according to an embodiment of the subject matter described herein.

As stated above, converter assembly 134, in one embodiment includes a series multiphase circuit. FIG. 11 illustrates a multiphase series converter circuit suitable for use with converter circuit assembly 134 according to an embodiment of the subject matter described herein. In FIG. 11, a converter circuit 153 includes phase group converter circuits 154 connected in series with each other across the power supply voltage to drive separate phases of stator 104. In the illustrated example, three phase group converter circuits 154 are illustrated. It is understood that any number of phase group converter circuits 154 may be included in converter circuit 153 without departing from the scope of the subject matter described herein. Each phase group converter circuit 154 drives three stator coils 120. Each phase group converter circuit 154 further includes individual coil converter subcircuits 156 for driving each coil. For simplicity of illustration, only one individual coil converter subcircuit 156 is labeled. Each individual coil converter subcircuit 156 in the illustrated example comprises two MOSFETs connected in series with each other to form an inverter. One end of each coil 120 is connected to the inverter output between the two MOSFETS, and the other end of each coil 120 is connected to another coil 120. The diode connected between the source and the drain of each MOSFET may be an integral component of each MOSFET which becomes forward biased when the source terminal becomes positive with respect to the drain.

Because phase group converter circuits 154 are connected in series across the power supply voltage, components, such as the MOSFETs, are not required to be rated for the entire power supply voltage. For example, if 4 phase group converter circuits 154 are included, each phase group converter circuit will only see ¼ of the power supply voltage and thus needs only to be rated for ¼ of the power supply voltage. In such an example, if the nominal power supply voltage is 600 VDC, each phase group converter circuit must be nominally rated for 150 VDC, which allows less expensive components to be used. Of course, due to switching transients and parasitics, the devices would not be explicitly rated at such an examplotory voltage, but a nontrivial increment above the nominal 150 VDC.

Each cell 154 acts as an individual three phase inverter. The other cells can either be with a phase shift to each other or without. For this particular example, phases AEI, FBJ, KGC and DLH in FIG. 3A will be each connected to individual three phase cell like 154. Each cell can be operated either in sinusoidal operation or brushless DC operation with trapezoidal waveform. Depending on the control method each cell can operate independent to each other or where each cell operation is centrally coordinated.

Figure 12A:
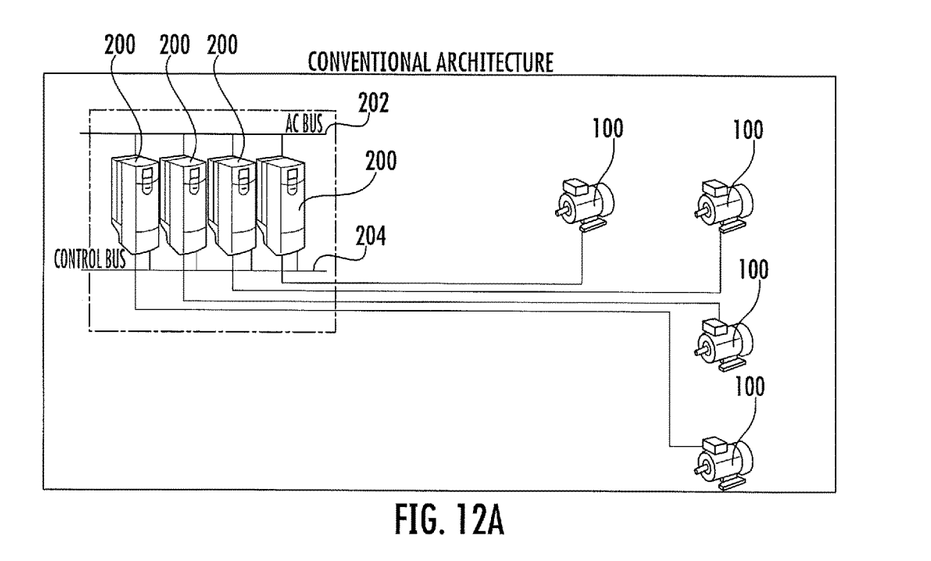
FIGS. 12A and 12B are block diagrams illustrating a comparison of the operation of multiphase fractional slot concentrated winding permanent magnet machines with either integrated or detachable converters and the operation of three phase machines with non-integrated phase conversion and control.
Figure 12B:
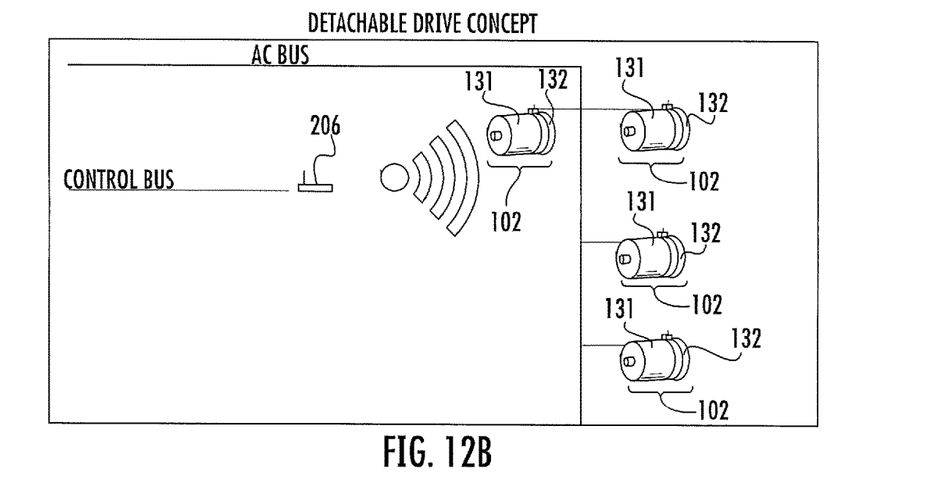

FIGS. 12A and 12B illustrate advantages of the subject matter described herein. In FIG. 12A, a conventional architecture where each 3 phase conventional motors 100 are connected to separate power supply cabinets 200 is illustrated. In the illustrated example, cabinets 200 receive power from an AC bus 202. A control bus 204 connects each cabinet to its respective induction motor 100. In contrast, as illustrated in FIG. 12B, machine modules 131 and converter modules 132 are integrated within multiphase fractional slot concentrated winding machines 102, which reduces the complexity of the architecture. Control of each machine 102 may be effected by a wired or wireless controller 206 that sends control signals to each converter module 132 to control the rate of rotation of each machine 102. Therefore it can be seen from FIGS. 12A and 12B that the number of power cables has reduced significantly. The bus could also be a DC bus in FIG. 12B.

Problems Overcome

The following problems may be at least partially overcome by the subject matter described herein.

The two part modular design facilitates the manufacturing of multiphase machine design as there are no loose cables in the machine, so that improvements using multiphase winding topologies can be realized.

The architecture described herein reduces the cost and size of the motor and drive mainly for general purpose applications. A potential cost saving of up to 25% is expected for the total costs. There is a cost reduction of up to 50% in the machine if aluminum windings are used compared to a conventional induction machine. If copper windings are used, a cost reduction of about 25% can be achieved, compared to conventional machines. Thus, the multiphase fractional slot winding machine described herein can include either copper or aluminum windings. The cost advantage increases when compared to other permanent magnet machines.

On the drive side, brushless DC (BLDC) operation will reduce the cost of position sensor (Hall effect type) and the current sensor (shunt type). In addition, there is no requirement that the drive (converter) include a digital signal processor (DSP) especially when each 3 phase converter cell in the multiphase converter is operated independently as the signal from the Hall sensors can be used directly to switch the MOSFET's The cost of increased number of components is offset by the cost savings of omitting a heat sink to cool the converter. Multiphase BLDC operation will have very low torque ripple (<3%) compared to a 3 phase BLDC motor drive system (>10%). This is also why 3 phase BLDC motor drive system are only used and available for smaller sub integral kW range. By using a multiphase series operation a major hurdle on the upscaling of BLDC motors from sub integral kW range to integral kW range is overcome. An additional advantage of the concept herein can be seen at the plant level where there are number of motor and drives. A comparison of the conventional architecture and the concept motor drive module is given in FIGS. 12A and 12B. A detachable drive can provide easy maintenance as compared to integrated drives where the motor needs to be un-mounted from the driven equipment. With this detachable drive especially at higher power range, the drive can be easily be detached and attached with another similar drive so that it is not necessary to unmount the machine.

Further Advantages

The following are additional advantages that may be achieved in whole or in part by the subject matter described herein:

A significant reduction in motor and drive cost is expected. The cost of the motor and drive (active components only) is expected to be about 75% less than the current state of art motor and drive. Similarly the motor and converter package will have the same size as a 4 pole induction motor alone of the same power rating and cooling capability.

Increased efficiency of the package is expected compared to current induction motor drive as multiphase drives with MOSFETs are inherently more efficient compared to their state of art counterpart.

Reduced losses are expected in the iron and rotor back iron of the motor with multiphase operation.

Increased power density is expected with multiphase operation.

A detachable drive is easy from maintenance point of view. For example, if the drive fails or requires repair, it can be detached from the motor by unplugging the connection and either replaced with a new drive module or repaired and re-attached to the motor.

The similar size of the motor drive package to a 4 pole induction motor means that this could be attractive for retrofit to current applications without any changes but with the benefit of variable speed or soft starting.

Several advantages of the subject matter described herein on a plant level are described above with regard to FIGS. 12A and 12B.

Possible Modifications

The following possible modifications are intended to be within the scope of the subject matter described herein.

In the examples above, the drive comprises a multiphase series drive where individual coils in each phase group are phase shifted with respect to each other. In an alternate implementation, the drive may be a multiphase series drive where the coils in each phase group are phase not phase shifted with respect to each other but where the phase groups are phase shifted with respect to each other.

In yet another alternative implementation, the drive may have an H bridge configuration with the motor connected as a load between the switches that form the bridge.

The drive can use any suitable waveform for driving the motor. In one implementation, the waveform may be a sinusoid. In an alternate implementation a trapezoidal waveform may be used.

The type of operation of the motor may be sinusoidal pulse width modulation (PWM) or brushless direct current (BLDC).

In the examples described above, the position of the rotor is determined using a Hall Effect sensor that senses the position of a magnet located on the rotor. The Hall Effect sensor may be located in the machine module or in the converter module. In an alternate implementation, other types of rotor position sensors, such as optical sensors, can be used.

In the examples described herein, control communications to the converter module can be transmitted over a wired or wireless medium. For example, if a wireless medium is used, 802.11 or Bluetooth communications can be used. If a wired medium is used, the wired medium may use electrical conductors or optical fibers.

In the examples described above, the rotor is an inner-type rotor located in the inner circumference of the stator. In an alternate implementation, the rotor may be an outer type rotor that surrounds that outer circumference of the stator The power supply to the multiphase fractional slot concentrated winding machine described herein can be AC or DC. If an AC power supply is used, the converter module may include a rectifier and a DC to multiphase converter. If a DC power supply is used, the rectifier may be omitted, and the converter module may only include a DC to multiphase converter.

Potential Applications

A multiphase fractional slot concentrated winding machine as described herein may be used in any suitable application and is especially well suited for variable speed drive applications. Examples of variable speed drive applications for the subject matter described herein include fans (e.g. for HVAC systems), compressors, and pumps. Using a variable speed drive rather than a constant speed drive saves energy because the speed of the drive can be modulated in response to the demand of the application. For example, in HVAC applications, a variable speed drive can be used to power a fan to move air only when needed, rather than operating the fan at a constant speed and using valves and ducts to direct airflow to the desired location.

It will be understood that various details of the subject matter described herein may be changed without departing from the scope of the subject matter described herein. Furthermore, the foregoing description is for the purpose of illustration only, and not for the purpose of limitation.

What is claimed is:

1. A multiphase fractional slot concentrated winding machine comprising:
    a machine module including a rotor and a stator, the stator including a plurality of radially extending teeth and each tooth being individually wound with a coil; and
    a multiphase series converter circuit including a plurality of converter circuits connected in series with each other across a power supply voltage and physically connected to an end of the machine module to energize the coils for multiphase operation,
    wherein the machine has multiphase fractional slot concentrated windings.

2. The multiphase fractional slot concentrated winding machine of claim 1 wherein the rotor includes permanent magnets and the machine comprises a permanent magnet machine.

3. The multiphase fractional slot concentrated winding machine of claim 1 wherein the rotor includes coils or rotor cage and the machine comprises an induction machine.

4. The multiphase fractional slot concentrated winding machine of claim 1 wherein the stator coils are wound in the same direction.

5. The multiphase fractional slot concentrated winding machine of claim 1 wherein the machine module includes a disk shaped printed circuit board connected to ends of the coils and to the multiphase series converter circuit.

6. The multiphase fractional slot concentrated winding machine of claim 5 comprising a converter module is detachably connectable to the machine module, wherein the converter module includes the converter circuit.

7. The multiphase fractional slot concentrated winding machine of claim 6 wherein the converter module is mounted to a non-drive end of the machine module.

8. The multiphase fractional slot concentrated winding machine of claim 6 comprising a disk shaped printed circuit board on which the converter circuit is mounted.

9. The multiphase fractional slot concentrated winding machine of claim 8 comprising an AC to DC rectifier circuit coupled to the converter circuit for rectifying AC power supply voltage to DC.

10. The multiphase fractional slot concentrated winding machine of claim 9 wherein the AC to DC rectifier circuit is located on the disk shaped printed circuit board.

11. The fractional slot concentrated winding machine of claim 9 wherein the AC to DC rectifier circuit is located on a second printed circuit board coupled to the disk shaped printed circuit board and located in the converter module.

12. The multiphase fractional slot concentrated winding machine of claim 9 wherein AC to DC rectifier circuit is located in or on the machine module.

13. The multiphase fractional slot concentrated winding machine of claim 6 wherein the converter module includes a fan for cooling the converter circuit and the machine module.

14. The multiphase fractional slot concentrated winding machine of claim 6 wherein the converter module includes a wireless communication port to communicate with a supervisory controller.

15. The multiphase fractional slot concentrated winding machine of claim 1 wherein the converter circuit is integrated within the machine module.

16. The multiphase fractional slot concentrated winding machine of claim 14 comprising an annular shaped printed circuit board coupled to the stator coils on a drive end of the machine module, wherein the converter circuit is located on the annular shaped printed circuit board.

17. The multiphase fractional slot concentrated winding machine of claim 16 comprising a fan coupled to a non-drive end of the machine module for cooling the machine module and the converter circuit.

18. The multiphase fractional slot concentrated winding machine of claim 1 wherein the multiphase series converter includes a plurality of phase group converter circuits connected in series with each other for dividing the power supply voltage.

19. The multiphase fractional slot concentrated winding machine of claim 18 wherein each phase group converter circuit includes a plurality of individual coil converter circuits for driving individual coils within each phase group.

20. A multiphase fractional slot concentrated winding machine comprising:
    a machine module including a rotor and a stator, the stator including a plurality of radially extending teeth and each tooth being individually wound with a coil; and
    a converter module detachably connectable to the machine module, the converter module including a multiphase series converter circuit to energize the coils for multiphase operation, the multiphase series converter circuit including a plurality of three-phase converter circuits connected in series with each other across a power supply voltage, wherein the output of each three-phase converter circuit of the plurality of three-phase converter circuits is phase shifted relative to the output of the other three-phase converter circuits of the plurality of converter circuits, wherein the converter module comprises a cylindrical member connectable to a non-drive end of the machine module,
    wherein the machine includes multiphase fractional slot concentrated windings.

21. A multiphase fractional slot concentrated winding machine comprising:
    a machine module including a rotor and a stator, the stator including a plurality of radially extending teeth and each tooth being individually wound with a coil; and
    a converter module detachably connectable to the machine module, the converter module including a multiphase series converter circuit to energize the coils for multiphase operation, wherein the multi-phase series converter circuit includes a plurality of phase group converter circuits that drive coils in a phase group with a common phase and that are connected in series across a power supply voltage to divide the power supply voltage,
    wherein the machine is constructed with multiphase fractional slot concentrated windings.

22. The multiphase fractional slot concentrated winding machine of claim 1, wherein each converter circuit is a three phase converter circuit.

23. The multiphase fractional slot concentrated winding machine of claim 22, wherein the number of phases of the multiphase fractional slot concentrated winding machine is 3 times the number of converter circuits of the plurality of converter circuits.

24. The multiphase fractional slot concentrated winding machine of claim 1, wherein the multiphase series converter circuit includes more than three phases.

25. The multiphase fractional slot concentrated winding machine of claim 1, wherein each converter circuit has more than one phase.

* * * * *